Sept. 15, 1925.
B. A. BARGERON
1,553,589
HEAT INSULATED CONTAINER
Filed Aug. 27, 1923

INVENTOR.
Byron A. Bargeron,
BY
ATTORNEYS.

Patented Sept. 15, 1925.

1,553,589

UNITED STATES PATENT OFFICE.

BYRON A. BARGERON, OF ATLANTA, GEORGIA.

HEAT-INSULATED CONTAINER.

Application filed August 27, 1923. Serial No. 659,679.

*To all whom it may concern:*

Be it known that I, BYRON A. BARGERON, a citizen of the United States, residing at Atlanta, in the county of Fulton and State of Georgia, have invented certain new and useful Improvements in Heat-Insulated Containers, of which the following is a specification.

The invention relates to receptacles, and has as an object the provision of a receptacle which is heat-insulated so that material may be carried therein without substantial change in temperature. A further object of the invention is the provision of a receptacle having a plurality of compartments each of which is individually heat-insulated. A further object of the invention is the provision of a receptacle in the nature of a tray, having a plurality of heat-insulated compartments into each of which a bottle of cold liquid may be placed and the bottles delivered without substantial change in their temperature.

An illustrative embodiment of the invention is shown in the accompanying drawings, in which—

Figure 1:
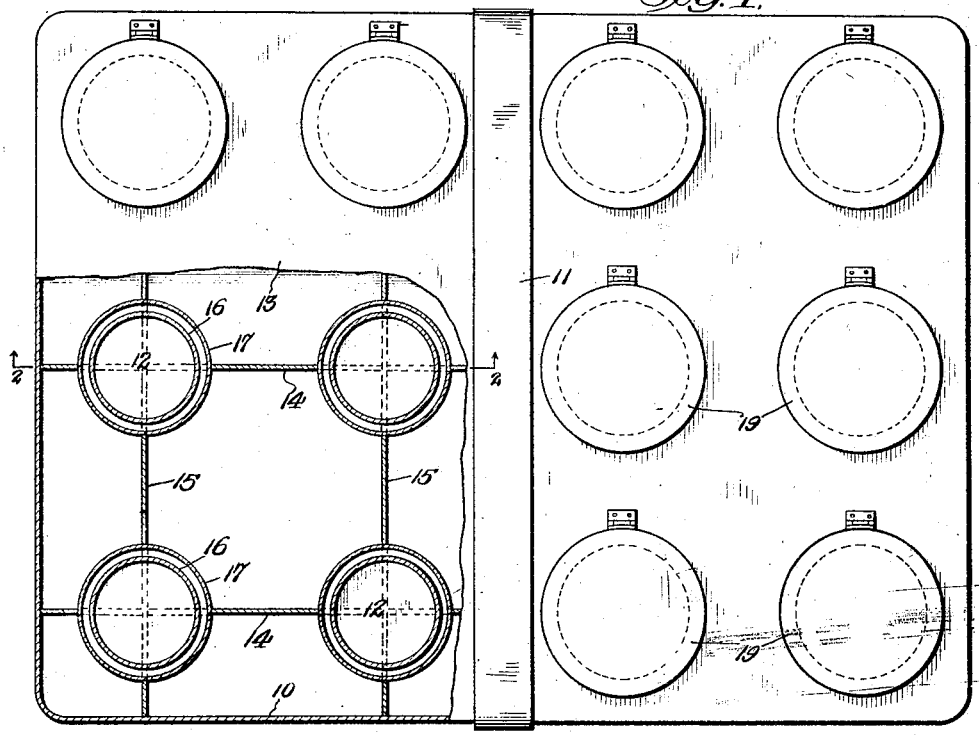
Fig. 1 is a plan view of the device, with the closures and top plate removed from one portion thereof.
Figure 2:
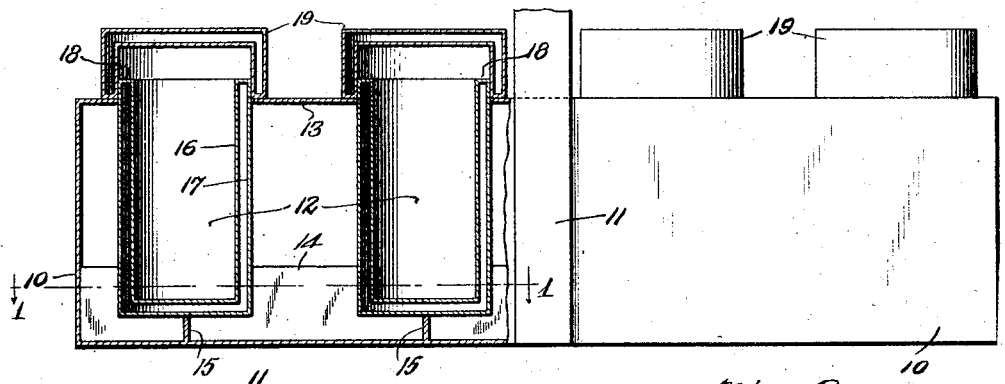
Fig. 2 is a side elevation, partly in central vertical section on line 2, 2 of Fig. 1.
Figure 3:
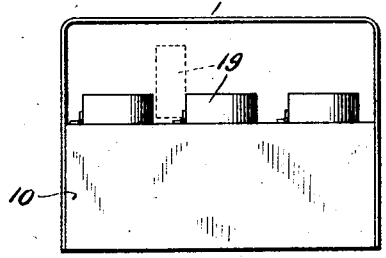
Fig. 3 is an end elevation.

As shown, the device comprises an outer shell or casing 10 of generally rectangular outline, and which may be formed of basket work, or of metal, but is preferably formed of the latter. For convenience in carrying the device with its contents, a handle 11 is shown secured midway of the long sides of the casing 10, and in the manner of the usual basket handle.

To contain bottles or other containers of liquid such as soft drinks, hot chocolate, or other drinks which it is desired to deliver ice cold or hot, to customers, a series of compartments 12 are provided. The compartments 12 are shown as rising through openings in a plate 13 which covers the upper portion of the shell 10, and has openings fitting closely about the containers 12. To support and maintain the spacing of the containers 12 there are shown a plurality of partitions 14 extending longitudinally of the device, and a second series of partitions 15 extending transversely of the device. The arrangement of the partitions 14, 15 is preferably such that they will contact with the compartments 12 at opposite ends of diameters of the containers and in such a manner that the partitions will be at right angles to each other. The partitions 14 are preferably continuous in the lower part of the shell below the compartments 12, the entire length of the shell, and the partitions 15 are so arranged as to project under the compartments and contact with the continuous portions of the partitions 14. With the partitions connected at their intersections, as by means of solder, it will be seen that seats will be provided for the compartments 12, which, in conjunction with the opening in the plate 13, will retain them firmly in position.

The walls of the compartments 12 are shown as double with the inner wall 16 spaced from the outer wall 17 thereof, and with an annular closure 18 for the space between the walls. Preferably, the compartments 12 are made of glass and the space between the walls 16, 17 is evacuated to provide an efficient heat-insulation. If desired, a filling of heat-insulating material may be placed between the compartments and also between the partitions 14, 15, under the plate 13.

A closure 19 for each of the compartments 12 is shown as being formed also of spaced walls which may be heat-insulated in any desired manner, each closure 19 being hinged separately to the plate 13, so that any desired bottle can be removed from its compartment without admission of warm air to any other compartment.

It is obvious that the walls 16, 17 of the compartments 12, as well as the walls of the closure 19, can be made of other materials than glass, and that the space between the same may be heat-insulated by introduction of any of the well known heat-insulating materials, if desired.

Minor changes may be made in the physical embodiment of the invention without departing from its spirit.

I claim:

1. A heat-insulated container comprising a shell or casing, a plurality of intersecting partitions in said casing, said partitions cutaway at their intersection from a plane spaced above the bottom of the shell to individually receive a plurality of compartments, means for individually heat-insulating each of said compartments, and heat-insulated closures for said compartments.

2. A heat-insulated container comprising an outer shell or casing, a plurality of partitions extending longitudinally of said casing, a plurality of partitions extending transversely of said casing, said partitions secured to each other at their intersections adjacent the lower portion of the casing and cutaway above said secured portions to provide seats, a plurality of double-walled, heat-insulated compartments supported in said seats, a closure for said shell having openings surrounding the upper end of said compartments and an individual double-walled, heat-insulated closure for each of said compartments hinged to said first named closure.

BYRON A. BARGERON.